Nov. 20, 1962   SHIGETADA FUKUOKA   3,064,522
ELECTRIC AUTOMATIC FILM AND SHUTTER WINDING
MECHANISM FOR PHOTOGRAPHIC CAMERAS
Filed June 2, 1959
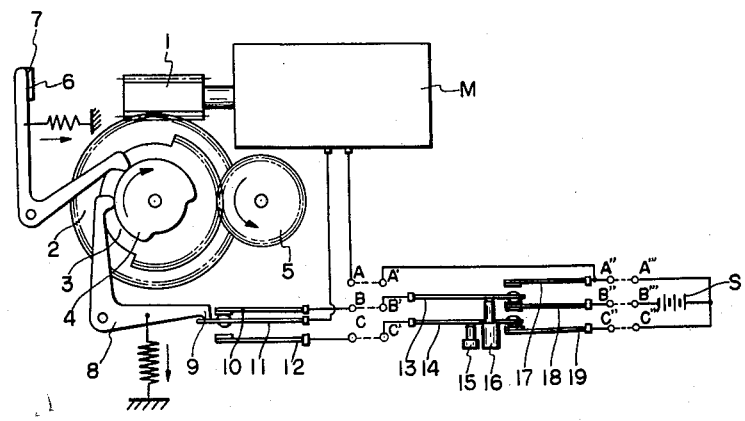
INVENTOR.
SHIGETADA FUKUOKA
BY
ATTORNEY

United States Patent Office 3,064,522
Patented Nov. 20, 1962

3,064,522
ELECTRIC AUTOMATIC FILM AND SHUTTER WINDING MECHANISM FOR PHOTOGRAPHIC CAMERAS
Shigetada Fukuoka, Tokyo, Japan, assignor to Nippon Kogaku K.K., Tokyo, Japan, a corporation of Japan
Filed June 2, 1959, Ser. No. 817,661
Claims priority, application Japan Jan. 23, 1959
4 Claims. (Cl. 88—18.2)

Conventional electric automatic film winding devices in photographic cameras have means whereby either (1) when a photograph is taken by depressing the shutter release button of the camera and thereupon the shutter button restored, the electric circuit of a driving motor is closed by means operatively connected with the shutter button and the film wound; while after the film is wound, the motor will stop; or (2) a film winding mechanism and a shutter release button depressing mechanism are provided to be alternately and repeatedly actuated so that, while the continuously photographing button is depressed, the motor circuit remains always connected to the electric source and the motor continues to rotate so as to alternately repeat the film winding and photographic exposure operating sequence.

In the first of the above, the mechanism for closing the electric circuit operatively connected with restoration of the shutter release button of the camera, is so complicated and delicate, that it is difficult to provide for interchangeability of the camera and the winding device. In the second of the above cases, there are means whereby for remote operation while the continuously photographing button is depressed, the electric circuit is opened and closed. However, in such case, when the electric circuit is opened, film feed will not always stop when the film is completely wound. Therefore, at the time of next exposure, the shutter may fail to take the intended picture. Further, remote operation for one-frame photography is so difficult in such case that there must be adopted a method wherein the push button is depressed by remotely operating a magnet.

In view of the above mentioned defects, the object of the present invention is to make one-frame photography simple and positive and to facilitate both direct and remote operation for continuous as also one-frame photography.

A clear concept of the scope and purpose of this invention may be obtained from the following description taken in connection with the attached drawing which shows a simplified schematic of an illustrative embodiment of the present invention.

Referring to the drawing, a gear 3 having teeth in but a sector thereof and a cam 4 are integral with a gear 2 to which rotation is transmitted through a reduction gear 1 from a motor M connected to an electric source S. A gear 5 is connected to the shutter and the film winding shaft of the camera through a joint or the like so that, when teeth of the gear 3 are in mesh with those of the gear 5, film is wound by the power of the motor but, when no teeth on the gear 3 are in mesh with teeth of the gear 5, no power is transmitted to the winding shaft. The cam 4 operates both the shutter and the driving circuit switch through levers 6 and 8 during that phase when no power is transmitted to the camera. That is to say, when the lever 6 in contact with the cam, falls into the valley part of the cam, one end 7 of the spring biased lever 6 will act to depress the shutter release button of the camera. When the lever 8 falls into the valley portion of the cam, one end 9 of the lever 8 will separate the contact 11 from the contact 10 and engage it to the contact 12. The connecting elements extending from A', B' and C' to A", B" and C," respectively, are change-over switch units, are of small size and can therefore be easily positioned in the automatic film winding device. They can also be positioned elsewhere and outside the automatic winding device and be connected with terminals A, B and C through three conductor cords. Further, these units can be connected in series in several stages by three-conductor cords between A, B and C and A", B" and C". In this way the automatic film winding device can be remotely operated from several separate places.

The contacts 13 and 14 are in contact with the contacts 18 and 19, respectively. However, when the continuous photography push button 15 is depressed, the contact 14 will separate from the contact 19 and will engage contact 18. Likewise, when the one-frame photography push button 16 is depressed, the contacts 13 and 14 will separate from the contacts 18 and 19 and will engage the contacts 17 and 18, respectively.

In the condition shown in the figure as the contacts 13 and 10 are in contacts with the contact 18 and 11, respectively, the motor is rotating the gear 3 clockwise driving the gear 5 counterclockwise to wind the film. However, the winding operation will end when the gear 5 will reach the cut-away toothless portion of the gear 3 and begins to idle. Then spring biased lever 8 will fall into the valley part of the cam 4 and the free end of the springy arm supporting contact 11 will separate from the contact 10 and engage the contact 12. Therefore, the motor is electrically braked and will suddenly stop, when winding of the film has been completed.

While the push button 15 is depressed, whichever of the contacts 10 and 12 the contact 11 may be in contact with, will engage the contact 18 through the contact 13 or 14, and thus the motor will be supplied with electric current independently of the phase of the cam 4, and will continue to rotate. Thereafter, when the lever 6 falls into the valley portion of the cam, the shutter will be released. When it has passed through the valley portion, the lever 6 will restore and the shutter release push button will likewise restore. Then, the toothed sector portion of the gear 3 will mesh with the gear 5 and the film will be wound. While, and as long as, push button 15 is depressed, the winding and photographic cycle will be thus alternately repeated. When the push button 15 is released, the same condition as is mentioned above will occur, film will be wound and the motor will stop.

As described above, in the state wherein the winding of film has been completed and the motor has stopped, the lever 8 will have fallen into the valley portion of the cam and the contact 11 will be in engagement with the contact 12. Now, when the push button 16 is depressed, with such contacts in this state, the motor will rotate due to the engagement of contacts 18 and 11 with the contact pieces 14 and 12, respectively, the lever 6 will fall into the valley portion of the cam and the shutter button depressed. Then the lever 8 will restore and separate the contact 11 from the contact 12 and engage it with the contact 10. Therefore, due to the engagement of the contacts 11 and 13 with the contacts 10 and 17, respectively, an electric braking effect will be exerted on the motor and the motor will suddenly stop, that is, in the condition of the device where the shutter button may be depressed. Therefore, the shutter can be operated for any time in seconds, including bulb (B) exposure time. When the push button 16 is released, the same sequence as mentioned above will occur, the motor will begin to rotate, the lever 6 will restore (if for the bulb (B) exposure, the shutter will be closed at this time), teeth of the gears 3 and 5 will then mesh with each other, film winding will be completed and the motor will stop. That is to say, one-frame photography can be made at all shutter times including bulb (B) time.

What I claim is:
1. An automatic film and shutter winding and selective shutter operating mechanism for photographic cameras comprising an electric motor, a source of potential, a film winding and shutter operating mechanism including a first gear, gearing interconnecting the motor and the first gear driving the first gear in a predetermined direction to wind film, the interconnecting gearing including a second gear having a toothless sectorial portion and a toothed portion meshing with the first gear, a cam integral with the second gear and having a depressed and a raised portion positioned in predetermined relation to the toothless portion of the second gear, and means for selectively connecting and disconnecting the motor and the source of potential comprising a double-throw switch having a first and a second fixed contact and a single movable contact connected with a terminal of the motor of which the other terminal is connected to one pole of the source of potential, a switching mechanism having two movable contacts and a first, a second and a third fixed contact, a first movable contact thereof being normally engaged to the second fixed contact thereof and the second movable contact being normally engaged to the third fixed contact thereof, a first and a second manually operable push button of which the first engages the second movable contact of the switching mechanism and the second engages both movable contacts of the switching mechanism for selectively connecting the first and second fixed contacts of the switch to the source of potential, firstly so that normally the first fixed and the movable contacts of the switch are connected by way of the first fixed contact of the switching mechanism and the first movable contact thereof to the potential source to supply energy to the motor, secondly, so that the first and second fixed contacts of the switch are connected to the potential source when the first push button is depressed irrespective of which of the first and second fixed contacts of the switch is engaged by the movable contact of the switch, and thirdly, so that when the second push button is depressed the second fixed contact and the movable contact of the switch are connected to the potential source to supply energy to the motor, a first and a second angle lever each of which is spring biased so that an arm of each rides on the cam, the cam follower arms of the angle levers being spaced circumferentially on the cam at a predetermined distance from each other, the other arm of the first angle lever of which the follower arm is in the leading position in the direction of cam rotation being biased to operate the shutter to exposure when such follower arm engages the depressed cam portion, and the other arm of the second angle lever engaging the movable contact of the switch for switching the movable contact from its normal engagement with the first fixed contact of the switch to engage the second fixed contact thereof when the second angle lever follower arm engages with the depressed portion of the cam to open the normal circuit from the potential source to the motor and with neither push button depressed connecting both sides of the motor to the same pole of the potential source shorting the circuit and braking the motor.

2. The automatic electric film and shutter winding and selective shutter operating mechanism according to claim 1 in which the first fixed contact of the switch is connected to a first of the two movable contacts of the switching mechanism, the second fixed contact of the switch is connected to the second of the two movable contacts of the switching mechanism, the movable contact of the switch is connected to one terminal of the motor, the first fixed contact of the switching mechanism is connected to the other terminal of the motor, the first movable contact of the switching mechanism in turn is selectively connectable to the fixed contact of the switching mechanism by depressing the second button and to the potential source in series with said other terminal of the motor, and the second movable contact of the switching mechanism is selectively connectable by depressing one of the first and second buttons to the source of potential in series with said other terminal of the motor.

3. The automatic electric film and shutter winding and selective shutter operating mechanism according to claim 1 in which the toothless sectorial portion of the second gear extends circumferentially substantially one-half the periphery of the second gear, and the raised portion of the cam is positioned so that it occupies at least all of the angular extent of the toothless sectorial portion of the second gear.

4. The automatic electric film and shutter winding and selective shutter operating mechanism according to claim 1 in which the depressed portion of the cam extends an angular extent which, in the direction of rotation of the cam, commences shortly after the toothless sectorial portion of the second gear terminates and terminates in advance of the commencement of the second gear toothless sectorial portion by an amount several times greater than that by which its own commencement lags after the termination of the second gear toothless sectorial portion.

References Cited in the file of this patent

UNITED STATES PATENTS

| | | |
|---|---|---|
| 2,203,783 | Hineline | June 11, 1940 |
| 2,326,386 | Newman | Aug. 10, 1943 |
| 2,393,534 | Hineline | Jan. 22, 1946 |
| 2,596,222 | Doyle et al. | May 13, 1952 |
| 2,827,834 | Chevillon et al. | Mar. 24, 1958 |

FOREIGN PATENTS

| | | |
|---|---|---|
| 1,027,981 | Germany | Apr. 10, 1958 |